United States Patent
Tanaka et al.

(10) Patent No.: US 7,307,831 B2
(45) Date of Patent: Dec. 11, 2007

(54) METHOD OF MANUFACTURING ELECTRODE AND ELECTRODE

(75) Inventors: Hideki Tanaka, Tokyo (JP); Yousuke Miyaki, Tokyo (JP); Kazuo Katai, Tokyo (JP); Kiyonori Hinoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/172,852

(22) Filed: Jul. 5, 2005

(65) Prior Publication Data
US 2006/0006063 A1 Jan. 12, 2006

(30) Foreign Application Priority Data
Jul. 7, 2004 (JP) ............................ P2004-200971

(51) Int. Cl.
*H01G 9/00* (2006.01)
(52) U.S. Cl. .................... 361/502; 29/25.03; 361/503
(58) Field of Classification Search ........ 361/502–503; 29/25.03
See application file for complete search history.

(56) References Cited

U.S. PATENT DOCUMENTS

| 4,041,211 A | * | 8/1977 | Wiacek ........................ 429/36 |
| 2002/0197535 A1 | * | 12/2002 | Dudley et al. .............. 429/246 |
| 2004/0221446 A1 | * | 11/2004 | Ohhara et al. ............. 29/623.5 |

FOREIGN PATENT DOCUMENTS

JP A 2000-106332 4/2000

* cited by examiner

*Primary Examiner*—Eric Thomas
(74) *Attorney, Agent, or Firm*—Oliff & Berridge, PLC

(57) ABSTRACT

A method of manufacturing an electrode includes a preparatory step of preparing an electrode matrix comprising a collector and an active material containing layer formed on at least one face of the collector, at least one edge part of the collector including an exposed surface free of the active material containing layer, an edge part of the active material containing layer on a side close to the exposed surface including a thinner part having a thickness smaller than a maximum thickness of the active material containing layer; and a roll-pressing step of pressing the electrode matrix with a roll press.

14 Claims, 12 Drawing Sheets

Fig.8
(a)
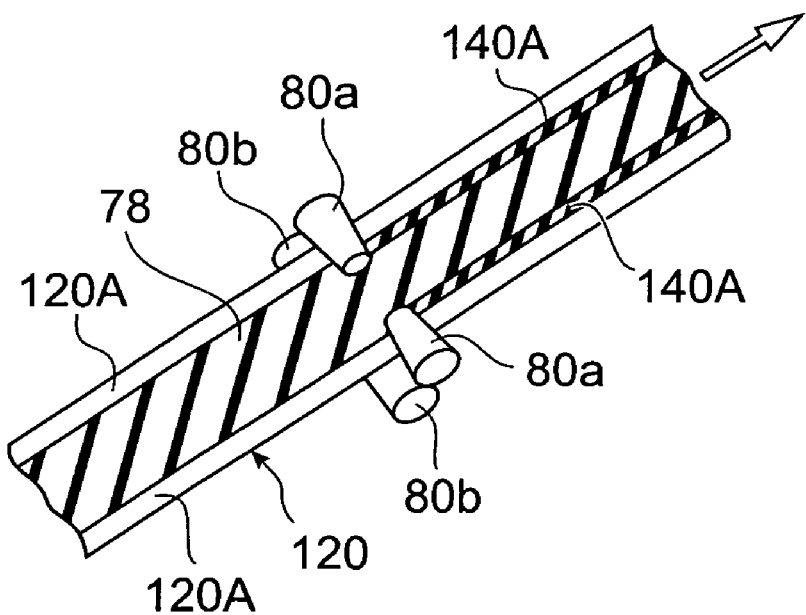
(b)
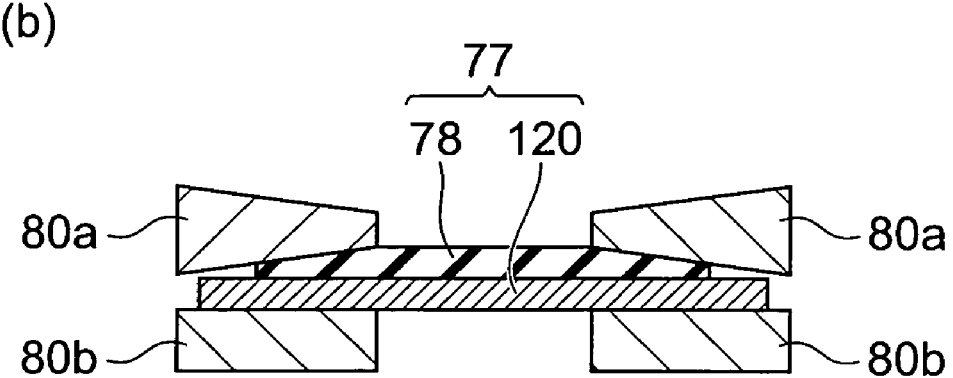

Fig.11
(a)
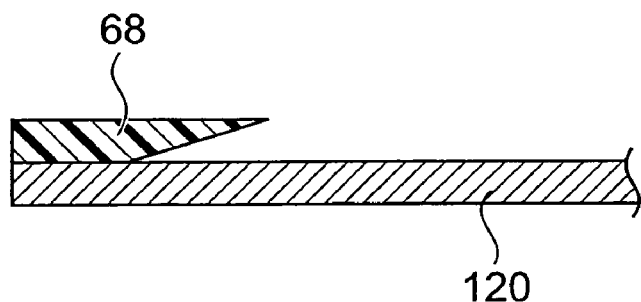
(b)
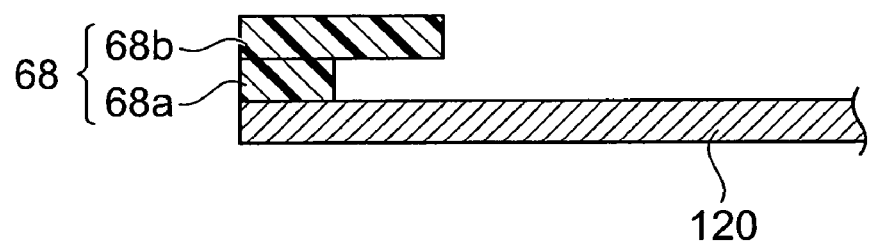

METHOD OF MANUFACTURING ELECTRODE AND ELECTRODE

BACKGROUND OF THE INVENTION

1. Field of the Invention

The present invention relates to a method of manufacturing an electrode and the electrode; and, more specifically, to a method of manufacturing an electrode used in electrochemical devices encompassing electrochemical capacitors such as electric double layer capacitors and secondary batteries such as lithium-ion secondary batteries, and the electrode.

2. Related Background Art

Electrochemical devices encompassing electrochemical capacitors such as electric double layer capacitors and secondary batteries such as lithium-ion secondary batteries can easily reduce their sizes and weights, and thus are expected to become power supplies or backup power supplies for portable devices (small-size electronic devices), for example, auxiliary power supplies for electric cars and hybrid cars, etc., and various studies have been underway in order to improve their performances. In the case where a large capacity is required as in a power supply for an electric car in particular, the development of electrochemical devices having a large capacity per unit volume of electrodes (hereinafter referred to as "volume capacity") has been desired.

Electrodes used in such an electrochemical device has a laminate structure including a collector and an active material containing layer, and can be made, for example, by applying a coating liquid containing a constituent material of the active material containing layer onto a surface of the collector and drying the liquid (see, for example, Japanese Patent Application Laid-Open No. 2000-106332).

Here, the coating liquid is applied to the collector surface such that a predetermined region, e.g., an edge part of the collector, attains an exposed state. When an exposed surface is thus provided in a part of the collector surface, an exposed part of the collector including the exposed surface can be used as an external output terminal for establishing an electric connection to the outside. Drying after applying the coating liquid can yield a laminate (a laminate to become an electrode) including a laminate part in which the active material containing layer is formed on the collector and the exposed part in which no active material containing layer is formed on the collector.

SUMMARY OF THE INVENTION

When the coating liquid is simply applied to the collector surface and dried as mentioned above, the active material containing layer formed thereby exhibits such a low density that a sufficient volume capacity is hard to attain. Therefore, for yielding an electrode having a sufficient volume capacity, the active material containing layer formed by coating is thereafter required to be compressed by pressing with a roll press or the like, so as to improve its density.

However, subjecting a laminate having the laminate part and exposed part as mentioned above to roll-pressing has been problematic in that the exposed part of the laminate is likely to be cut off from the laminate part because of the shearing stress of the rolls. It seems that, when the rolls reach the laminate part of the laminate from the exposed part while the laminate is introduced between the rolls from the exposed part side, a large shearing stress is exerted on a boundary portion between the laminate part and exposed part, thereby causing the cutting. Electrodes whose boundary portion between the laminate part and exposed part is thus cut will be selectively discarded, thus leaving a problem of poor yield. When carrying out roll-pressing while in a state where an exposed part is formed in only one edge part of the laminate, the laminate may be introduced between rolls from the laminate part side formed with no exposed part. Even in this case, a large shearing stress is exerted on the boundary portion between the laminate part and exposed part when the rolls reach the exposed part from the laminate part, thereby cutting the exposed part. Though roll-pressing with such a low pressure that the exposed part is not cut has been under consideration, the density of the active material containing layer may not improve sufficiently, whereby it is hard to attain an electrode having a sufficient volume capacity in this case.

In view of the problems of prior art mentioned above, it is an object of the present invention to provide a method of manufacturing an electrode which can fully restrain the boundary portion between the laminate part and exposed part in the collector from being cut and can yield an electrode having a sufficient volume capacity, and such an electrode.

The inventors conducted diligent studies in order to achieve the above-mentioned object and, as a result, have found that a method of manufacturing an electrode which yields an electrode by roll-pressing an electrode matrix having a predetermined form can achieve the above-mentioned object, thereby completing the present invention.

Namely, in one aspect, the present invention provides a method of manufacturing an electrode, the method comprising a preparatory step of preparing an electrode matrix comprising a collector and an active material containing layer formed on at least one face of the collector, at least one edge part of the collector including an exposed surface free of the active material containing layer, an edge part of the active material containing layer on a side close to the exposed surface including a thinner part having a thickness smaller than a maximum thickness of the active material containing layer; and a roll-pressing step of pressing the electrode matrix with a roll press.

The method of manufacturing an electrode in accordance with the present invention prepares an electrode matrix comprising an active material containing layer formed with the above-mentioned thinner part, and subjects the electrode matrix to roll-pressing. Since the active material containing layer is formed with the thinner part, the stepped gap between the exposed part including the exposed surface in the collector and the laminate part in which the active material containing layer is formed on the collector can be reduced, whereby the shearing stress exerted on the boundary portion between the laminate part and exposed part at the time of roll-pressing can fully be suppressed. Therefore, the method of manufacturing an electrode in accordance with the present invention can fully restrain the boundary portion between the laminate part and exposed part of the collector from being cut.

Since the boundary portion between the laminate part and exposed part of the collector can fully be kept from being cut, the pressure at the time of roll-pressing can be set sufficiently high, so that the active material containing layer can fully be compressed, so as to improve the density. Therefore, the method of manufacturing an electrode in accordance with the present invention can yield an electrode having a sufficient volume capacity.

Preferably, in the method of manufacturing an electrode in accordance with the present invention, the thinner part has a tapered cross-sectional form whose thickness tapers down toward the exposed surface of the collector.

When the thinner part of the active material containing layer has a tapered cross-sectional form whose thickness tapers down toward the exposed surface of the collector (hereinafter referred to as "cross-sectional taper form" as the case may be), there is no stepped gap in the thinner part, thus making it possible to fully prevent the shearing stress from being exerted intensively on specific portions of the electrode matrix. This can fully restrain the boundary portion between the laminate part and exposed part of the collector from being cut, and the active material containing layer from chipping, peeling, etc.

Since the roll-pressing can be performed at a higher pressure, the active material containing layer can be compressed more, so as to improve the density further, whereby an electrode having a fuller volume capacity can be obtained.

Preferably, in the method of manufacturing an electrode in accordance with the present invention, the width $W_1$ (µm) of the thinner part in a direction from an edge part of the active material containing layer to a center part thereof satisfies the condition represented by the following expression (1):

$$(4 \times D_1) \leq W_1 \leq (30 \times D_1) \quad (1)$$

where $D_1$ is the maximum thickness (µm) of the active material containing layer in the electrode matrix.

When the width $W_1$ of the thinner part satisfies the condition of the above-mentioned expression (1), the boundary portion between the laminate part and exposed part in the collector can more fully be restrained from being cut by roll-pressing. When the thinner part has the above-mentioned cross-sectional taper form in particular, the angle of inclination of the cross-sectional taper form with respect to the collector surface can be made sufficiently small. Therefore, the shearing stress at the time of roll-pressing can more fully be restrained from being exerted on specific portions of the electrode matrix. This can fully keep the boundary portion between the laminate part and exposed part of the collector from being cut at the time of roll-pressing, and the active material containing layer from chipping, peeling, etc. This also makes it possible to carry out roll-pressing at a higher pressure, whereby an electrode having a fuller volume capacity can be obtained.

Preferably, the thickness $D_2$ (µm) of the thinner part at a position closest to the exposed surface satisfies the condition represented by the following expression (2):

$$D_2 \leq (0.1 \times D_1) \quad (2)$$

where $D_1$ is the maximum thickness (µm) of the active material containing layer in the electrode matrix.

When the above-mentioned thickness $D_2$ satisfies the condition of the above-mentioned expression (2), the stepped gap between the laminate part and exposed part is sufficiently reduced, whereby the shearing stress exerted on the boundary portion between the laminate part and exposed part at the time of roll-pressing can more fully be suppressed. This can sufficiently restrain the boundary portion between the laminate part and exposed part of the collector from being cut at the time of roll-pressing. This also makes it possible to carry out roll-pressing at a higher pressure, whereby an electrode having a fuller volume capacity can be obtained.

When the thickness of the thinner part at the position closest to the exposed surface is not uniform in the present invention, it will be sufficient if the smallest thickness satisfies the condition of the above-mentioned expression (2).

Preferably, the electrode matrix has respective exposed surfaces at both edge parts of the face of the collector, and respective thinner parts at both edge parts of the active material containing layer close to the exposed surfaces.

When both edge parts of the collector are thus formed with respective exposed surfaces in the case where electrodes are obtained by cutting and the like after roll-pressing, the first electrode can be obtained by carrying out an initial cutting operation so as to include one exposed surface, and then the second electrode can be obtained by carrying out another cutting operation so as to include the other exposed surface, which is advantageous in that the productivity can be improved.

Forming both edge parts of the active material containing layer with respective thinner parts sufficiently restrains a large shearing stress from being exerted on the boundary portion between the laminate part and exposed part when rolls reach the laminate part from one exposed part of the electrode matrix in the case where the electrode matrix is subjected to roll-pressing. Since the edge part of the active material containing layer on a side close to the other exposed part is also formed with a thinner part, this edge part can fully be restrained from chipping, peeling, etc. in particular when the rolls reach the other exposed part from the laminate part. Also, a large shearing stress can fully be restrained from being exerted on the boundary part between the laminate part and exposed part at that time. This can sufficiently restrain the boundary portion between the laminate part and exposed part of the collector from being cut at the time of roll-pressing, and the active material containing layer from chipping, peeling, etc. This also makes it possible to carry out roll-pressing at a higher pressure, whereby an electrode having a fuller volume capacity can be obtained.

Preferably, the preparatory step in the method of manufacturing an electrode in accordance with the present invention is a step including a first precursor layer forming step of forming a first precursor layer to become the active material containing layer onto the face of the collector so as to leave the exposed surface in at least one edge part of the face; and a thinner part forming step of forming a thinner part at an edge part of the first precursor layer on the side close to the exposed surface, so as to yield the electrode matrix.

When the preparatory step includes the above-mentioned first precursor layer forming step and thinner part forming step, an electrode matrix comprising the above-mentioned thinner part can be obtained efficiently and reliably. Yielding the electrode matrix by way of these steps and subjecting the electrode matrix to roll-pressing can sufficiently restrain the boundary portion between the laminate part and exposed part of the collector from being cut at the time of roll-pressing. This also makes it possible to carry out roll-pressing at a higher pressure, whereby an electrode having a fuller volume capacity can be obtained.

Preferably, the thinner part forming step is a step of forming the thinner part by shaving the edge part of the first precursor layer. This can form the thinner part more efficiently and more reliably.

The thinner part forming step may be a step of forming the thinner part by pressing the edge part of the first precursor layer. This can also form the thinner part more efficiently and more reliably. When forming the thinner part by pressing, it will be preferred if the pressing is carried out by using a roll member capable of pressing the edge part of the first precursor layer.

The preparatory step in the method of manufacturing an electrode in accordance with the present invention may be a step including a coating liquid preparing step of preparing an active material containing layer forming coating liquid containing an electrode active material, a binder adapted to bind the electrode active material, and a liquid adapted to dissolve or disperse the binder; a masking step of covering at least one edge part of the face of the collector with a mask member having a protrusion projecting in a direction to be formed with the active material containing layer so as to form a gap with the collector; a second precursor layer forming step of applying the active material containing layer forming coating liquid onto the face of the collector and then eliminating the liquid, so as to form a second precursor layer to become the active material containing layer, and yield a second laminate; and a removing step of removing the mask member from the second laminate, so as to form the exposed surface on the face of the collector and form the thinner part at an edge part of the second precursor layer on a side close to the exposed surface, and yield the electrode matrix.

When the preparatory step includes the coating liquid preparing step, masking step, second precursor layer forming step, and removing step, the electrode matrix having the configuration mentioned above can be obtained efficiently and reliably. Here, the thinner part in the electrode matrix is formed by a process in which the active material containing layer forming coating liquid enters the gap between the protrusion and collector in the mask member, and then the liquid is removed therefrom. Yielding the electrode matrix by way of these steps and subjecting the electrode matrix to roll-pressing can sufficiently restrain the boundary portion between the laminate part and exposed part of the collector from being cut. This also makes it possible to carry out roll-pressing at a higher pressure, whereby an electrode having a fuller volume capacity can be obtained.

The preparatory step in the method of manufacturing an electrode in accordance with the present invention may be a step including a coating liquid preparing step of preparing an active material containing layer forming coating liquid containing an electrode active material, a binder adapted to bind the electrode active material, and a liquid adapted to dissolve or disperse the binder; and an active material containing layer forming step of applying the active material containing layer forming coating liquid onto the face of the collector such as to leave the exposed surface in at least one edge part of the face and then eliminating the liquid, so as to form the active material containing layer, and yield the electrode matrix; wherein the active material containing layer forming step reduces an amount of the active material containing layer forming coating liquid applied to a region to be formed with the thinner part so as to form the thinner part at the edge part of the active material containing layer on the side close to the exposed surface.

When the preparatory step includes the coating liquid preparing step and active material containing layer forming step, the electrode matrix having the configuration mentioned above can be obtained efficiently and reliably. Yielding the electrode matrix by way of these steps and subjecting the electrode matrix to roll-pressing can sufficiently restrain the boundary portion between the laminate part and exposed part of the collector from being cut. This also makes it possible to carry out roll-pressing at a higher pressure, whereby an electrode having a fuller volume capacity can be obtained.

Preferably, the active material containing layer forming coating liquid prepared in the coating liquid preparing step and used in the second precursor layer forming step and active material containing layer forming step further contains a conductive auxiliary agent.

When the active material containing layer forming coating liquid contains a conductive auxiliary agent, the viscosity of the coating liquid can easily be adjusted, so that the time required for eliminating the liquid after applying the coating liquid can easily be regulated. This makes it easy to adjust the shape of the thinner part, whereby the thinner part having the above-mentioned cross-sectional taper form can easily be formed, for example. Also, since the finally obtained electrode contains the conductive auxiliary agent in the active material containing layer, electrode characteristics can be made favorable.

In another aspect, the present invention provides an electrode comprising a collector and an active material containing layer formed on at least one face of the collector; wherein at least one edge part of the collector includes an exposed surface free of the active material containing layer; wherein an edge part of the active material containing layer on a side close to the exposed surface includes a thinner part having a thickness smaller than a maximum thickness of the active material containing layer; and wherein the collector and active material containing layer are pressed.

While the active material containing layer in such an electrode is pressed, the active material containing layer has a thinned part, so that a boundary portion between a laminate part and an exposed part in the collector is hard to cut at the time of pressing, whereby the collector and active material containing layer can be pressed at a high pressure with a roll press or the like. Therefore, the electrode of the present invention has a fully densified active material containing layer and thus can attain a sufficient volume capacity. Since the edge part of the active material containing layer is formed as a thinner part, the edge part of the active material containing layer can sufficiently be restrained from coming into contact with other members, etc. and causing the active material containing layer to chip and peel at the time of manufacturing an electrochemical device by using this electrode.

Preferably, in the electrode of the present invention, the thinner part has a tapered cross-sectional form whose thickness tapers down toward the exposed surface of the collector.

The thinner part having such a cross-sectional taper form can more fully restrain the boundary part between the laminate part and exposed part in the collector from being cut, and the active material containing layer from chipping and peeling, whereby the collector and active material containing layer can be pressed at a higher pressure with a roll press or the like. Therefore, such an electrode has a fully densified active material containing layer, and thus can yield a fuller volume capacity. Since the thinner part has a cross-sectional taper form, the edge part of the active material containing layer can more fully be restrained from coming into contact with other members, etc. and causing the active material containing layer to chip and peel at the time of manufacturing an electrochemical device by using this electrode.

Preferably, in the electrode in accordance with the present invention, the width $W_2$ (μm) of the thinner part in a direction from the edge part of the active material containing layer to a center part thereof satisfies the condition represented by the following expression (3):

$$(4 \times D_3) \leq W_2 \leq (30 \times D_3) \qquad (3)$$

where $D_3$ is the maximum thickness (μm) of the active material containing layer in the electrode.

The width $W_2$ satisfying the condition of the above-mentioned expression (3) can more fully restrain the boundary portion between the laminate part and exposed part from being cut and the active material containing layer from chipping and peeling at the time of pressing, whereby the collector and active material containing layer can be pressed at a higher pressure with a roll press or the like. Therefore, such an electrode has a more fully densified active material containing layer, and thus can yield a fuller volume capacity. The width $W_2$ satisfying the condition of the above-mentioned expression (3) can more fully restrain the edge part of the active material containing layer from coming into contact with other members, etc. and causing the active material containing layer to chip and peel at the time of manufacturing an electrochemical device by using this electrode.

Preferably, the thickness $D_4$ (μm) of the thinner part at a position closest to the exposed surface satisfies the condition represented by the following expression (4):

$$D_4 \leq (0.1 \times D_3) \qquad (4)$$

where $D_3$ is the maximum thickness (μm) of the active material containing layer in the electrode.

When the above-mentioned thickness $D_4$ satisfies the condition of the above-mentioned expression (4), the stepped gap between the laminate part and exposed part is sufficiently reduced, so that the boundary portion between the laminate part and exposed part in the collector is hard to cut at the time of pressing, whereby the collector and active material containing layer can be pressed at a higher pressure with a roll press or the like. Therefore, such an electrode has a more fully densified active material containing layer, and thus can yield a fuller volume capacity. The thickness $D_4$ satisfying the condition of the above-mentioned expression (4) can more fully restrain the edge part of the active material containing layer from coming into contact with other members, etc. and causing the active material containing layer to chip and peel at the time of manufacturing an electrochemical device by using this electrode.

The present invention can provide a method of manufacturing an electrode which can fully restrain the boundary portion between the laminate part and exposed part in the collector from being cut and can yield an electrode having a sufficient volume capacity. The present invention can also provide an electrode which has a sufficient volume capacity, while being able to fully restrain the active material containing layer from chipping and peeling at the time of manufacturing an electrochemical device.

BRIEF DESCRIPTION OF THE DRAWINGS

FIG. 8 shows explanatory views for explaining a method of forming a thinned part by using roll members;

FIG. 11 shows schematic sectional views showing respective examples of mask member.

DESCRIPTION OF THE PREFERRED EMBODIMENTS

In the following, preferred embodiments of the present invention will be explained in detail with reference to the drawings when appropriate. In the following explanation, parts identical or equivalent to each other will be referred to with numerals identical to each other without repeating their overlapping descriptions.

Electrode

Figure 1:
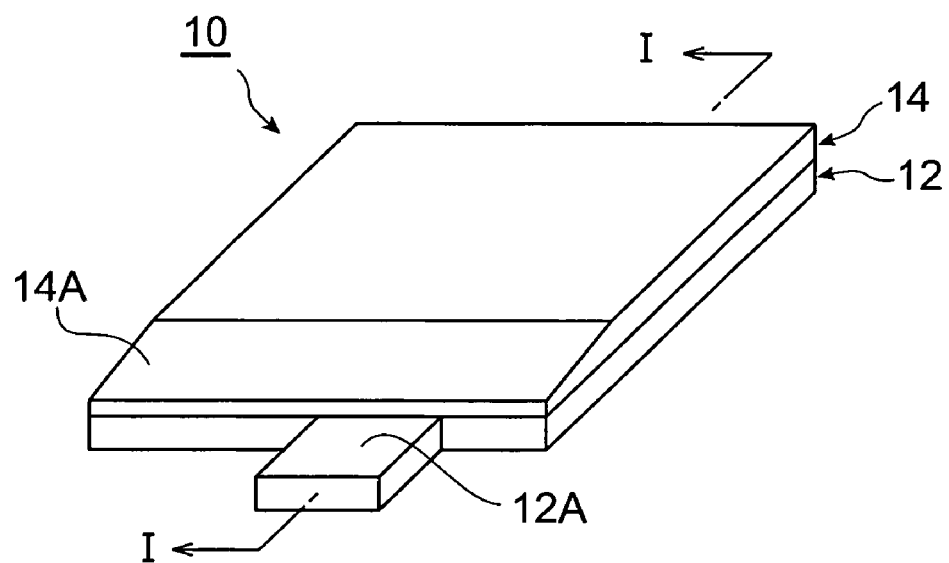
FIG. 1 is a perspective view showing a preferred embodiment of the electrode in accordance with the present invention.
Figure 2:
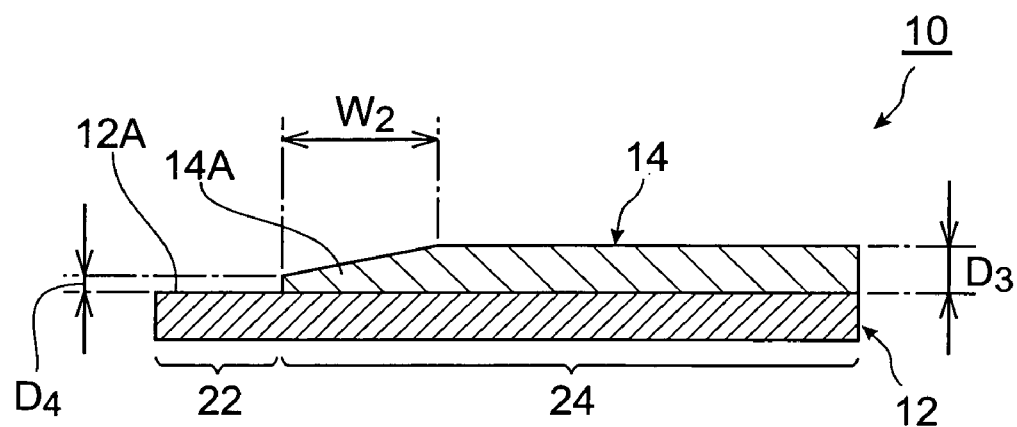
FIG. 2 is a schematic sectional view of the electrode taken along the line I-I of FIG. 1.

FIG. 1 is a perspective view showing a preferred embodiment of the electrode in accordance with the present invention, whereas FIG. 2 is a schematic sectional view of the electrode taken along the line I-I of FIG. 1. As shown in FIGS. 1 and 2, this electrode 10 comprises a flat collector 12 and an active material containing layer 14 formed on a face of the collector 12. An exposed surface 12A free of the active material containing layer 14 is provided at an edge part of the face of the collector 12, whereas a thinned part 14A having a thickness smaller than the maximum thickness $D_1$ of the active material containing layer 14 is provided at an edge part of the active material containing layer 14 on the side close to the exposed surface 12A. The thinned part 14 has a tapered cross-sectional form (cross-sectional taper form) whose thickness tapers down toward the exposed surface 12A of the collector 12. The electrode 10 is further constituted by an exposed part 22 including the exposed surface 12A where the active material containing layer 14 is not formed on the collector 12 and a laminate part 24 where the active material containing layer 14 is formed on the collector 12. When an electrochemical device is formed by use of the electrode 10, the exposed part 22 is employed as an external output terminal. In the electrode 10, the collector 12 and active material containing layer 14 have been subjected to pressing.

The collector 12 is not restricted in particular as long as it is a conductor which can sufficiently transfer electric charges to the active material containing layer 14, whereby collectors employed in known electrochemical device electrodes can be used. Examples of the collector 12 are foils of metals such as aluminum, whereas those etched, extended, and so forth can be used as the metal foils without any restrictions in particular.

The thickness of the collector 12 is preferably 10 to 50 μm, more preferably 15 to 30 μm. When the thickness of the collector 12 is less than the lower limit mentioned above, the exposed part 22 is more likely to be cut than in the case where the thickness falls within the range mentioned above, which makes it difficult for the active material containing layer 14 to be pressed at a sufficiently high pressure, whereby the volume capacity of the electrode 10 tends to decrease. When the thickness exceeds the upper limit mentioned above, on the other hand, it tends to be harder to reduce the size and weight.

The active material containing layer 14 is formed on the collector 12, and contributes to accumulating and discharging electric charges. The active material containing layer 14 is mainly constituted by an electrode active material, a conductive auxiliary agent, and a binder.

The electrode active material may vary depending on the species of electrochemical device. When the electrochemical device is an electrode layer capacitor, for example, porous particles having such an electronic conductivity as to contribute to accumulating and discharging electric charges are used as the electrode active material. For example, particulate or fibrous activated carbons and the like are used as porous particles. More specific examples of these activated carbons include phenol-based activated carbon and coconut shell activated carbon. In the present invention, "capacitor" and "condenser" are synonymous with each other.

When the electrochemical device is a lithium-ion secondary battery, the electrode active material for use may vary depending on whether the electrode is an anode or a cathode. When the electrode is an anode, carbon materials which can occlude/release lithium ions (by intercalating/deintercalating or doping/undoping), such as graphite, carbon which is hard to graphitize, carbon which is easy to graphitize, and carbon sintered at a low temperature; metals adapted to combine with lithium, such as Al, Si, and Sn; amorphous compounds mainly composed of oxides, such as $SiO_2$ and $SnO_2$; and lithium titanate ($Li_3Ti_5O_{12}$), for example, are used as an electrode active material.

When the electrode is a cathode, lithium cobaltate ($LiCoO_2$), lithium nickelate ($LiNiO_2$), lithium manganese spinel ($LiMn_2O_4$), mixed metal oxides represented by the general formula of $LiNi_xMn_yCo_zO_2$ (x+y+z=1), lithium vanadium compounds, $V_2O_5$, olivine-type $LiMPO_4$ (where M is Co, Ni, Mn, or Fe), and lithium titanate ($Li_3Ti_5O_{12}$), for example, are used as the electrode active material.

The conductive auxiliary agent is added when necessary. The conductive auxiliary agent is not restricted in particular as long as it can sufficiently advance the migration of electric charges between the collector 12 and active material containing layer 14. For example, carbon black is used therefor.

While examples of the above-mentioned carbon black include acetylene black, Ketjen black, and furnace black, acetylene black is preferably used in the present invention.

The binder is not restricted in particular as long as it can bind the above-mentioned electrode active material and conductive auxiliary agent to each other. Examples of the binder include polytetrafluoroethylene (PTFE), polyvinylidene fluoride (PVDF), polyethylene (PE), polypropylene (PP), and fluorine rubber.

Examples of the above-mentioned fluorine rubber include vinylidene-fluoride/hexafluoropropylene-based fluorine rubber (VDF/HFP-based fluorine rubber), vinylidene-fluoride/hexafluoropropylene/tetrafluoroethylene-based fluorine rubber (VDF/HFP/TFE-based fluorine rubber), vinylidene-fluoride/pentafluoropropylene-based fluorine rubber (VDF/PFP-based fluorine rubber), vinylidene-fluoride/pentafluoropropylene/tetrafluoroethylene-based fluorine rubber (VDF/PFP/TFE-based fluorine rubber), vinylidene-fluoride/perfluoromethylvinyl-ether/tetrafluoroethylene-based fluorine rubber (VDF/PFMVE/TFE-based fluorine rubber), and vinylidene-fluoride/chlorotrifluoroethylene-based fluorine rubber (VDF/CTFE-based fluorine rubber). Among them, fluorine rubber products in which at least two species selected from the group consisting of VDF, HFP, and TFE are copolymerized are preferred. VDF/HFP/TFE-based fluorine rubber in which the three species of the above-mentioned group are copolymerized is preferred in particular since the adhesion and chemical resistance tend to be improved thereby.

The thickness of the active material containing layer 14 containing these components is preferably 1 to 300 µm, more preferably 3 to 200 µm, from the viewpoint of reducing the size and weight of the electrode.

The electrode 10 has the above-mentioned configuration, while the collector 12 and active material containing layer 14 have been subjected to pressing. Since the active material containing layer 14 includes the thinner part 14A, the boundary portion between the exposed part 22 and laminate part 24 in the collector 12 is hard to be cut at the time of pressing, whereby the collector 12 and active material containing layer 14 can be pressed at a high pressure with a roll press or the like. Therefore, the electrode 10 of the present invention has the active material containing layer 14 densified sufficiently and thus can attain a sufficient volume capacity. The edge part of the active material containing layer 14 formed into the thinner part 14A can sufficiently be restrained from coming into contact with other members, etc., and causing the active material containing layer 14 to chip and peel.

Preferably, in the electrode 10, the width $W_2$ (µm) of the thinner part in a direction from the edge part of the active material containing layer 14 to a center part thereof satisfies the condition represented by the following expression (3):

$$(4 \times D_3) \leq W_2 \leq (30 \times D_3) \tag{3}$$

where $D_3$ is the maximum thickness (µm) of the active material containing layer in the electrode.

The width $W_2$ satisfying the condition of the above-mentioned expression (3) can more fully restrain the exposed part 22 of the collector 12 from being cut and the active material containing layer 14 from chipping and peeling at the time of pressing, whereby the collector 12 and active material containing layer 14 can be pressed at a higher pressure with a roll press or the like. Therefore, this electrode 10 has the active material containing layer 14 more fully densified, and thus can yield a fuller volume capacity. The width $W_2$ satisfying the condition of the above-mentioned expression (3) can more fully restrain the edge part of the active material containing layer 14 from coming into contact with other members, etc. and causing the active material containing layer 14 to chip and peel at the time of manufacturing an electrochemical device by using this electrode.

When $W_2$ is less than $(4 \times D_3)$ here, the cutting of the boundary portion between the exposed part 22 and laminate part 24, the chipping and peeling of the active material containing layer 14, and the like are more likely to occur than in the case where $W_2$ satisfies the above-mentioned condition, so that the pressing of the active material containing layer 14 tends to be insufficient, thereby lowering the volume capacity of the electrode 10. When $W_2$ exceeds $(30 \times D_3)$, on the other hand, the volume of the active material containing layer 14 tends to decrease, thereby reducing the capacity of the electrode as compared with the case where $W_2$ satisfies the above-mentioned condition.

Preferably, in the electrode 10, the thickness $D_4$ (μm) of the thinner part 14A at a position closest to the exposed surface 12A satisfies the condition represented by the following expression (4):

$$D_4 \leq (0.1 \times D_3) \qquad (4)$$

where $D_3$ is the maximum thickness (μm) of the active material containing layer in the electrode.

When the thickness $D_4$ satisfies the condition of the above-mentioned expression (4), the stepped gap between the exposed part 22 and laminated part 24 (i.e., the stepped gap corresponding to $D_4$) is sufficiently reduced, so that the exposed part 22 of the collector 12 is less likely to be cut at the time of pressing, whereby the collector 12 and active material containing layer 14 can be pressed at a higher pressure with a roll press or the like. Therefore, this electrode 10 has the active material containing layer 14 more fully densified, and thus can yield a fuller volume capacity. The width $D_4$ satisfying the condition of the above-mentioned expression (4) can more fully restrain the edge part of the active material containing layer 14 from coming into contact with other members, etc. and causing the active material containing layer 14 to chip and peel at the time of manufacturing an electrochemical device by using this electrode.

When $D_4$ exceeds $(0.1 \times D_3)$ here, the boundary part between the exposed part 22 and laminate part 24 is more likely to be cut than in the case where $D_4$ satisfies the above-mentioned condition, so that the pressing of the active material containing layer 14 tends to become insufficient, thereby lowering the volume capacity of the electrode 10.

Method of Manufacturing Electrode

First Embodiment

A preferred embodiment (first embodiment) of the method of manufacturing an electrode in accordance with the present invention for manufacturing the above-mentioned electrode 10 will now be explained.

Figure 3:
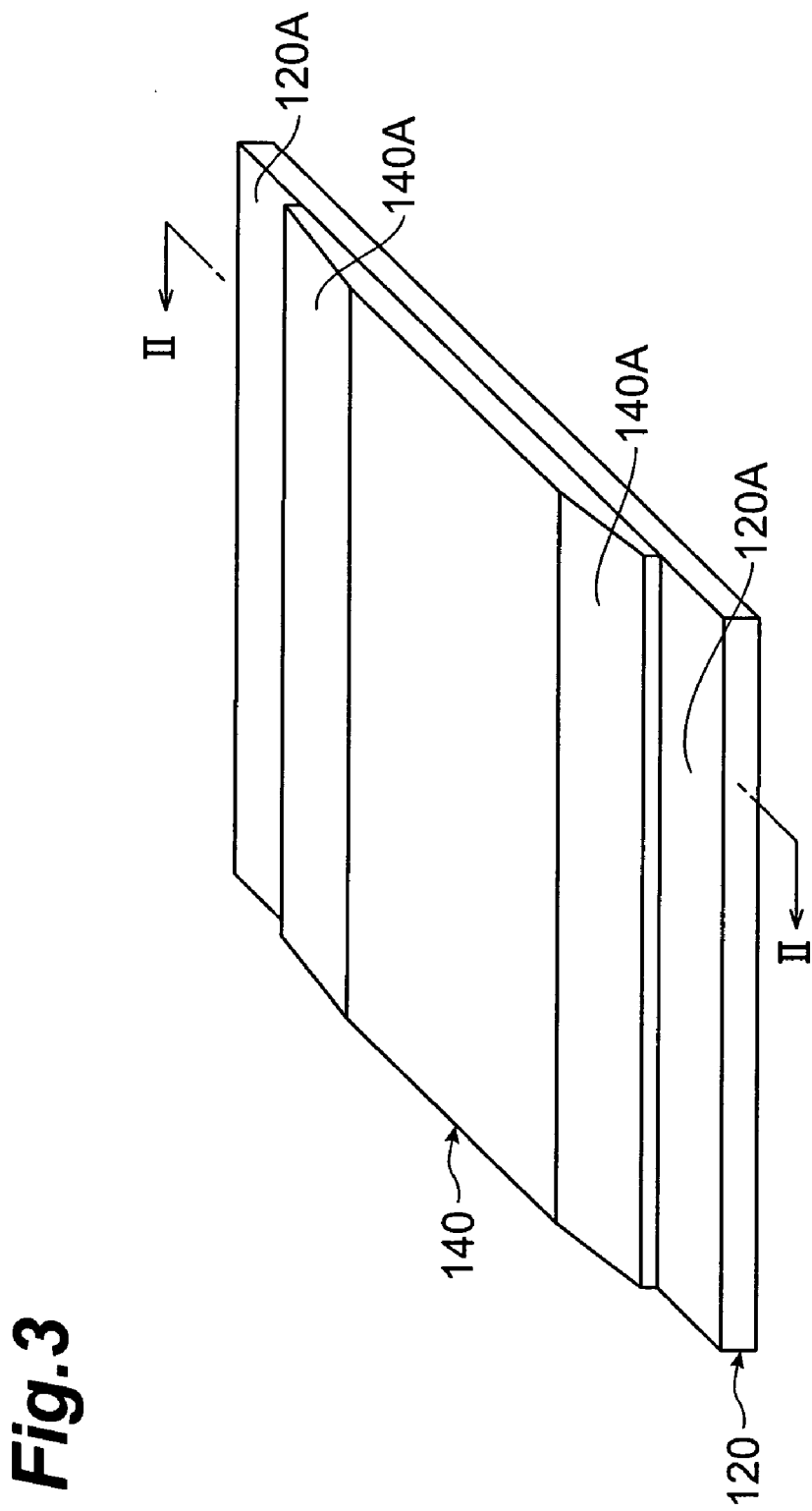
FIG. 3 is a perspective view showing an example of electrode matrix used in a method of manufacturing the electrode in accordance with the present invention.
Figure 4:
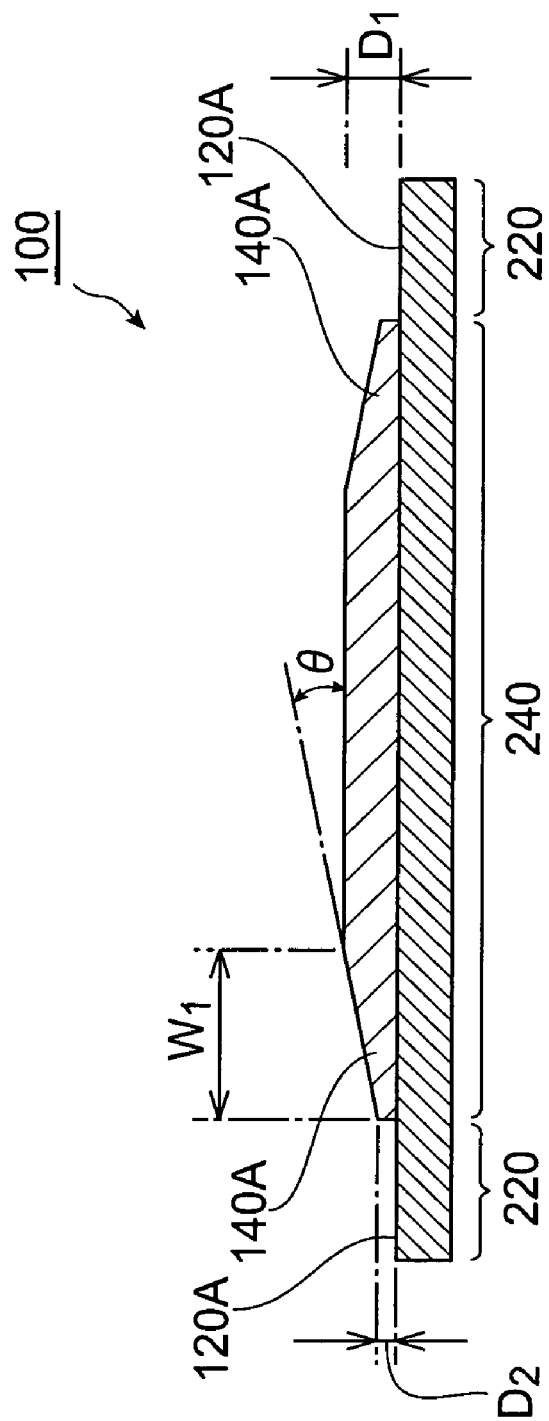
FIG. 4 is a schematic sectional view of the electrode matrix taken along the line II-II of FIG. 3.

FIG. 3 is a perspective view showing an example of electrode matrix used in the method of manufacturing an electrode in accordance with the present invention, whereas FIG. 4 is a schematic sectional view of the electrode matrix taken along the line II-II of FIG. 3. As shown in FIGS. 3 and 4, this electrode matrix 100 comprises a flat collector 120 and an active material containing layer 140 formed on a face of the collector 120. Respective exposed surfaces 120A free of the active material containing layer 140 are provided at both edge parts of the face of the collector 120, whereas respective thinner parts 140A each having a thickness smaller than the maximum thickness $D_1$ of the active material containing layer 140 are provided at both edge parts of the active material containing layer 140 close to the exposed surfaces 120A. Each thinner part 140A has a tapered cross-sectional form (cross-sectional taper form) whose thickness tapers down toward its corresponding exposed surface 120A of the collector 120. The electrode matrix 100 is further constituted by exposed parts 220 in which the active material containing layer 140 is not formed on the collector 120, and a laminate part 240 in which the active material containing layer 140 is formed on the collector 120.

First, in the method of manufacturing an electrode in accordance with the present invention, a preparatory step of preparing the above-mentioned electrode matrix 100 is carried out. The preparatory step will now be explained in detail.

Figure 5:
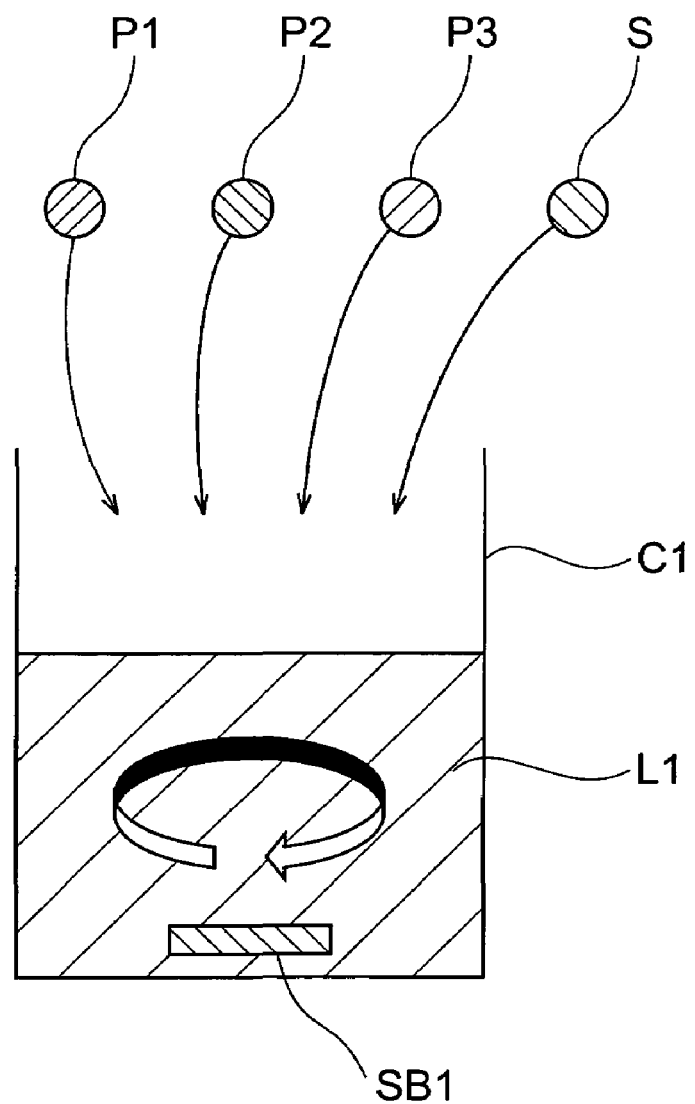
FIG. 5 is an explanatory view for explaining a coating liquid preparing step of preparing an active material containing layer forming coating liquid.

FIG. 5 is an explanatory view for explaining a coating liquid preparing step of preparing an active material containing layer forming coating liquid.

First, as shown in FIG. 5, an electrode active material P1, a conductive auxiliary agent P2, a binder P3, and a solvent S adapted to dissolve or disperse the binder P3 and disperse the electrode active material P1 and conductive auxiliary agent P2 are fed into a container C1 accommodating a stirring bar SB1 therein, and are stirred, so as to prepare an active material containing layer forming coating liquid L1.

The electrode active materials, conductive auxiliary agents, and binders exemplified in the explanation of the electrode can be used here as the electrode active material P1, conductive auxiliary agent P2, and binder P3.

Examples of the solvent S include ketone-based solvents such as methyl ethyl ketone (MEK) and methyl isobutyl ketone (MIBK).

Without preparing the active material containing layer forming coating liquid, a sheet-like first precursor layer to become the active material containing layer 120 may be manufactured by preparing a kneaded product by adding the conductive auxiliary agent P2 and binder P3 to the electrode active material P1 and kneading them, and extending the kneaded product into a sheet form. Preferably, in this case, the electrode active material P1 and conductive auxiliary agent P2 are distributed uniformly and are entrapped by the binder P3 at substantially the same strength. To this aim, it will be preferred if the kneading is carried out sufficiently, and the expanding is repeatedly performed in both longitudinal and lateral directions. When the sheet-like first precursor layer is thus manufactured, this layer can be bonded to the collector 120 by using conductive particles, for example, so as to form the first precursor layer on the collector 120.

Figure 6:
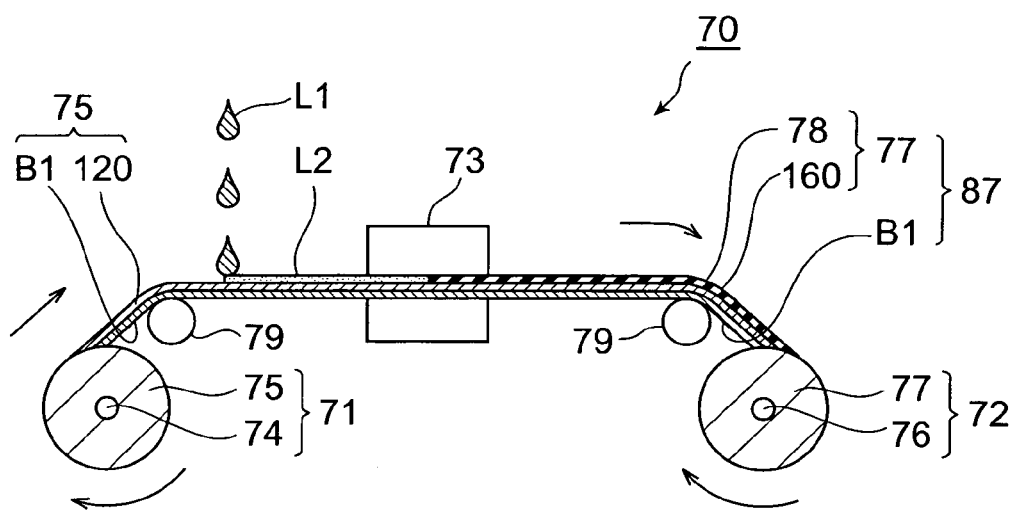
FIG. 6 is an explanatory view for explaining a step of forming a first laminate by using the active material containing layer forming coating liquid.
Figure 7:
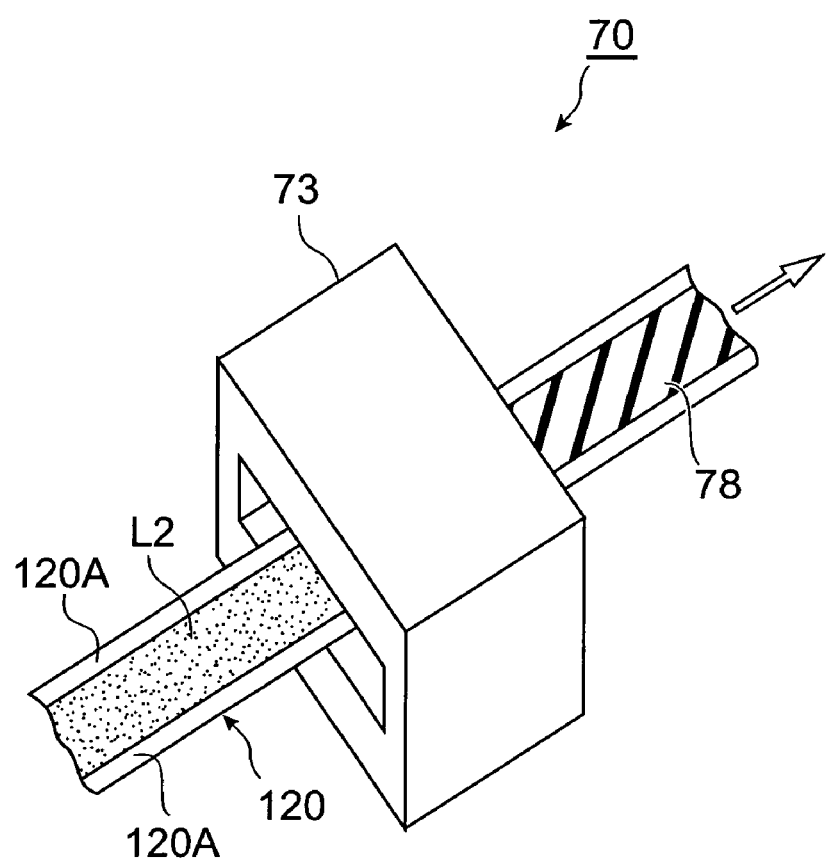
FIG. 7 is an explanatory view for explaining the step of forming the first laminate by using the active material containing layer forming coating liquid.

Subsequently, using the above-mentioned active material containing layer forming coating liquid L1 and an apparatus 70 shown in FIGS. 6 and 7, a first precursor layer forming step of laminating a first precursor layer to become the active material containing layer 140 onto the collector 120 so as to form a first laminate 77 is carried out. FIGS. 6 and 7 are explanatory views for explaining a step of applying the active material containing layer forming coating liquid L1 onto the collector and drying the same, so as to yield the first laminate 77.

The apparatus 70 shown in FIGS. 6 and 7 is mainly constituted by a first roll 71, a second roll 72, a dryer 73 disposed between the first roll 71 and second roll 72, and two support rolls 79. The first roll 71 is constituted by a cylindrical core 74 and a tape-like laminate sheet 75. The laminate sheet 75 has one end connected to the core 74 and is wound thereabout. The laminate sheet 75 further has a configuration in which a sheet-like collector 120 is laminated on a base sheet B1. Here, a metal foil sheet is used as the collector 120, for example.

The second roll 72 includes a cylindrical core 76 to which the other end of the laminate sheet 75 is connected. Connected to the core 76 of the second roll 72 is a core-driving motor (not depicted) for rotating the core 76, whereby a laminate sheet 87 having the active material containing layer forming coating liquid L1 laminated thereon and then dried in the dryer 73 is wound at a predetermined speed.

First, when the core-driving motor revolves, the core 76 of the second roll 72 is rotated, whereby the laminate sheet 75 wound about the core 74 of the first roll 71 is reeled out of the first roll 71. Subsequently, the active material containing layer forming coating liquid L1 is applied onto the collector 120 of thus reeled-out laminate sheet 75. This forms a coating L2 made of the active material containing layer forming coating liquid L1 on the collector 120. Here, the active material containing layer forming coating liquid L1 is applied to only the center part of the collector 160, while leaving exposed surfaces 120A free of the coating L2 in edge parts of the collector 120 (see FIG. 7).

After the coating L2 is formed, the laminate sheet 75 is introduced into the dryer 73 as the core-driving motor revolves. In the dryer 73, the coating L2 on the laminate sheet 75 is dried, so as to become a first precursor layer 78, thereby yielding a first laminate 77 in which the first precursor layer 78 is formed on the collector 120. The first precursor layer 78 is a layer to become an active material containing layer 140 when the electrode matrix 100 is made, and is a layer in a state before the thinner part 14A is formed. As the core-driving motor revolves, the laminate sheet 87 in which the first laminate 77 made of the collector 120 and first precursor 78 is laminated on the base sheet B1 is guided by the support rolls 79 to the core 76 and wound thereabout.

Next, respective thinner parts 140A are formed at both edge parts close to the exposed surfaces 120A in the first precursor layer 78 in the first laminate 77, so as to make a sheet-like electrode matrix.

Here, the thinner parts 140A are formed by shaving the edge parts of the first precursor layer 78 or pressing the edge parts (a thinner part forming step).

Examples of the method of forming the thinner parts 140A by shaving include (1) methods of shaving with cutters and the like; (2) methods of shaving with abrasive paper, whetstones, buffs, and the like; and (3) methods of shaving with blasting, etching, and the like.

When forming the thinner parts 140A by pressing, a method shown in FIG. 8 can be used, for example. The explanatory views for explaining a method of forming the thinner parts 140A by pressing the edge parts of the first precursor layer 78 with roll members are shown in (a) and (b) of FIG. 8. As shown in (a) and (b) of FIG. 8, the forming of the thinner parts 140A by pressing can be carried out by pressing the edge parts of the first precursor layer 78 with roll members 80a, 80b. Each of the roll members 80a has an outer surface coming into contact with the surface of the first precursor layer 78 and having a shape in conformity to that of the thinner part 140A to be formed. Each of the roll members 80b has an outer surface coming into contact with the surface of the collector 120, whereas its form is not restricted in particular as long as the edge part of the first precursor layer 78 can sufficiently be pressed therewith. Pressing the edge parts of the first precursor layer 78 with these roll members 80a and 80b can form the thinner parts 140A efficiently and reliably.

When forming the thinner parts 140 by pressing, the edge parts of the first precursor layer 78 may be pressed by flat-pressing, so as to form the thinner parts 140A. The pressing may be carried out with heating as well.

The thinner parts 140A are thus formed at the edge parts of the first precursor layer 78, so as to yield a sheet-like electrode matrix.

The sheet-like electrode matrix is cut into predetermined sizes, whereby the making of the electrode matrix 100 having the configuration shown in FIGS. 3 and 4 is completed.

Next, a roll-pressing step of pressing the electrode matrix 100 with a roll press is carried out.

Figure 9:
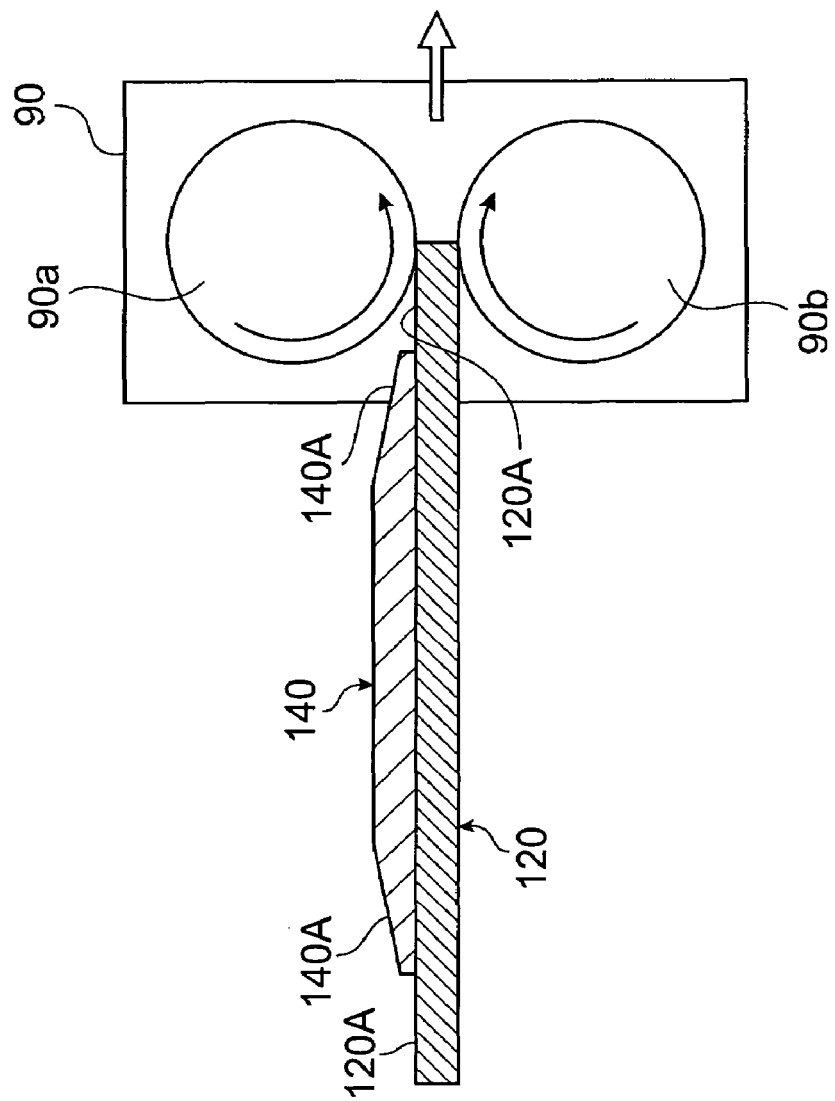
FIG. 9 is an explanatory view for explaining a step of pressing the electrode matrix with a roll press.

FIG. 9 is an explanatory view for explaining a step of pressing the electrode matrix 100 with a roll press. As shown in FIG. 9, two cylindrical rollers 90a, 90b are provided in this roll press 90. The two cylindrical rollers 90a, 90b are arranged such that the electrode matrix 100 is inserted therebetween.

The rollers 90a, 90b are placed such that the electrode matrix 100 can be pressed and heat-treated at a predetermined temperature and a predetermined pressure. The cylindrical rollers 90a, 90b are provided with respective rotating mechanisms for rotating them in directions conforming to the moving direction of the electrode matrix 100 (the direction of arrow in the drawing).

When the electrode matrix 100 is inserted between the rollers 90a and 90b in the roll press 90 by moving in the direction of arrow in the drawing, the surface of the roller 90a initially comes into contact with the exposed surface 120A of the collector 120 in the electrode matrix 100, and then with the outer surface of the thinner part 140A of the active material containing layer 140. On the other hand, the surface of the roller 90b comes into contact with the outer surface of the collector 120.

Since the thinner parts 140A each having a cross-sectional taper form are formed at both edge parts of the active material containing layer 140 in the electrode matrix 100, the stepped gap between the exposed part 220 including the exposed surface 120A of the collector and the laminate part 240 in which the active material containing layer 140 is formed on the collector 120 is lowered, whereby the shearing stress exerted on their boundary portion is suppressed sufficiently. Then, while the exposed part 220 of the collector 120 is fully restrained from being cut from the laminate part 240, the electrode matrix 100 is pressed at a sufficiently high pressure with the rollers 90a, 90b.

Next, thus pressed electrode matrix is cut into electrodes having a size in conformity to the scale of an electrochemical device to be mounted as necessary.

Figure 10:
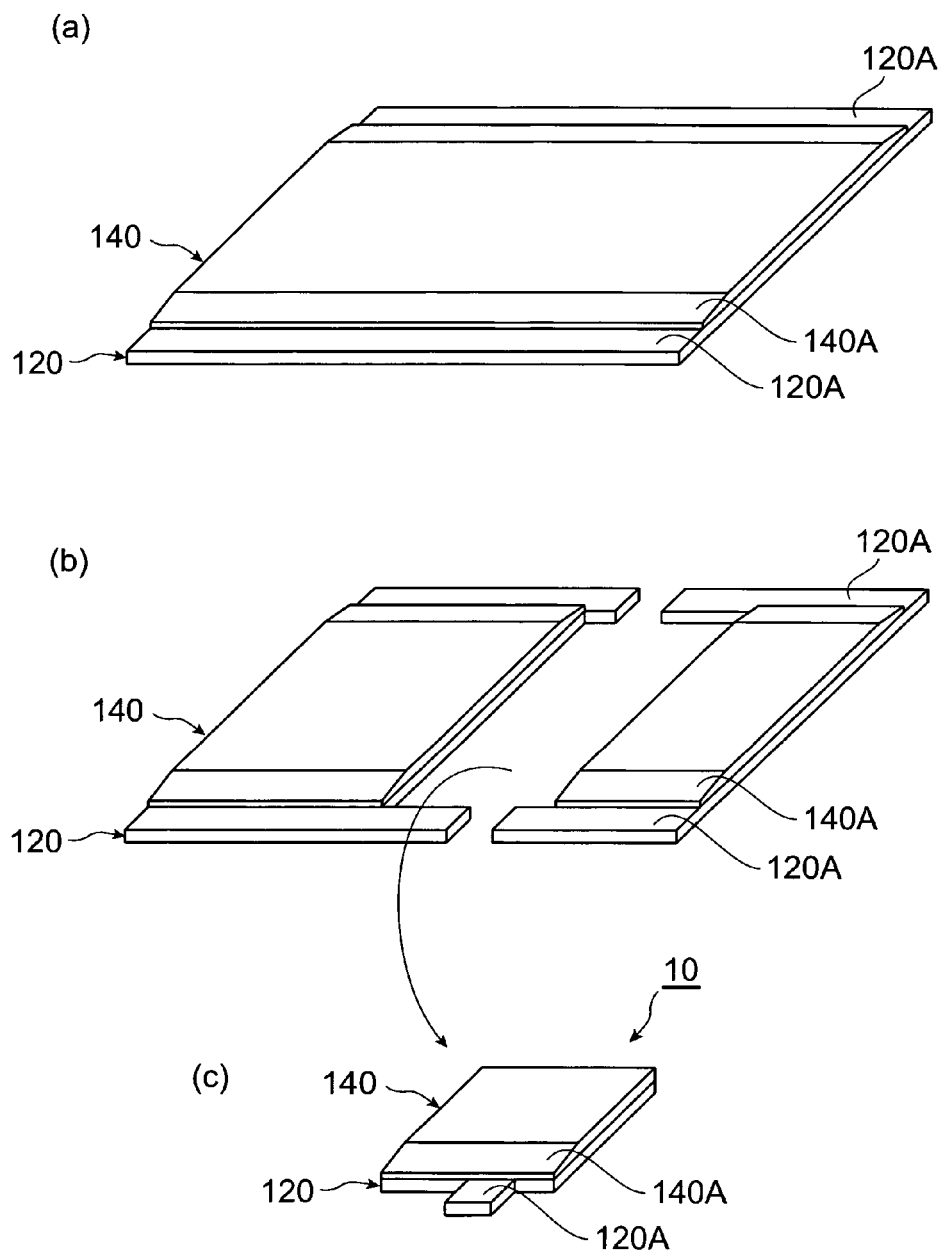
FIG. 10 shows steps of forming an electrode from the pressed electrode matrix.

A series of charts showing steps of forming an electrode 10 by cutting the pressed electrode matrix into predetermined sizes are shown in (a) to (c) of FIG. 10. The pressed electrode matrix shown in (a) of FIG. 10 is punched out into a predetermined size and form in conformity to the scale of an electrochemical capacitor to be made as shown in (b) of FIG. 10, whereby the electrode 10 shown in (c) of FIG. 10 is obtained.

The foregoing completes the making of the electrode 10 in accordance with the present invention shown in FIGS. 1 and 2.

Since thus obtained electrode 10 has been pressed at a sufficiently high pressure in the above-mentioned roll-pressing step, the active material containing layer 14 is fully densified, so that a sufficient volume capacity can be obtained.

Though the electrode matrix 100 is subjected to the roll-pressing step and then is cut into a predetermined size and form, so as to form the electrode 10 in the foregoing explanation, these steps may be carried out in reverse. Namely, after cutting the electrode matrix 100 into a predetermined size and form required for an electrode, the roll-pressing step may be performed, so as to form the electrode 10.

Preferably, in the method of manufacturing an electrode in accordance with the present invention, the width $W_1$ (μm) of each thinner part 140A in a direction from its corresponding edge part of the active material containing layer 140 to the center part thereof satisfies the condition represented by the following expression (1):

$$(4 \times D_1) \leq W_1 \leq (30 \times D_1) \tag{1}$$

where $D_1$ is the maximum thickness (μm) of the active material containing layer in the electrode matrix.

When the width $W_1$ of the thinner part 140A satisfies the condition of the above-mentioned expression (1), the boundary portion between the laminate part 140 and exposed part 220 in the collector 120 can be more fully be restrained from being cut by roll-pressing. When the thinner part 140A has a cross-sectional taper form in particular, the angle of inclination θ(°) of the cross-sectional taper form with respect to the surface of the collector 120 can be made sufficiently small. Therefore, the shearing stress at the time of roll-pressing can fully be restrained from being exerted on specific portions of the electrode matrix 100. This can more fully keep the boundary portion between the active material containing layer 140 and exposed part 220 of the collector 120 from being cut at the time of roll-pressing, and the active material containing layer from chipping, peeling, etc. This also makes it possible to carry out roll-pressing at a higher pressure, whereby the electrode 10 having a fuller volume capacity can be obtained.

When $W_1$ is less than $(4 \times D_1)$ here, the cutting of the boundary portion between the exposed part 220 and laminate part 240, the chipping and peeling of the active material containing layer 140, and the like at the time of roll-pressing are more likely to occur than in the case where $W_1$ satisfies the above-mentioned condition. When $W_1$ exceeds $(30 \times D_1)$, on the other hand, the volume of the active material containing layer 140 tends to decrease, thereby reducing the capacity of the resulting electrode 10 as compared with the case where $W_1$ satisfies the above-mentioned condition.

Preferably, the thickness $D_2$ (μm) of the thinner part 140A at a position closest to the exposed surface 120A of the collector 120 satisfies the condition represented by the following expression (2):

$$D_2 \leq (0.1 \times D_1) \qquad (2)$$

where $D_1$ is the maximum thickness (μm) of the active material containing layer in the electrode matrix.

When the thickness $D_2$ satisfies the condition of the above-mentioned expression (2), the stepped gap between the exposed part 220 and laminate part 240. (i.e., the stepped gap corresponding to $D_2$) is sufficiently reduced, whereby the shearing stress exerted on their boundary portion can fully be suppressed. This can sufficiently restrain the boundary portion between the active material containing layer 140 and exposed part 220 of the collector 120 from being cut. This also makes it possible to carry out roll-pressing at a higher pressure, whereby the electrode 10 having a fuller volume capacity can be obtained.

When $D_2$ exceeds $(0.1 \times D_1)$, the boundary portion between the exposed part 220 and laminate part 240 is more likely to be cut at the time of roll-pressing than in the case where $D_2$ satisfies the above-mentioned condition, so that the pressing of the active material containing layer 140 tends to become insufficient, thereby lowering the volume capacity of the electrode 10.

Second Embodiment

A second embodiment of the method of manufacturing an electrode in accordance with the present invention will now be explained. The method of manufacturing an electrode in accordance with the second embodiment is the same as the method of manufacturing an electrode in accordance with the first embodiment except that the preparatory step of preparing the electrode matrix 100 is carried out as follows.

First, in the preparatory step in the second embodiment, a coating liquid preparing step of preparing an active material containing layer forming coating liquid L1 is performed. This coating liquid preparing step can be carried out by the same method as that of the coating liquid preparing step in the first embodiment.

Subsequently performed is a masking step of covering at least one edge part of the face of the collector 120 with a mask member having a protrusion projecting in a direction to be formed with the active material containing layer 140 so as to form a gap with the collector 120.

Schematic sectional views showing respective examples of the mask member used in the masking step are shown in (a) and (b) in FIG. 11. The mask member 68 may have a tapered protrusion as shown in (a) of FIG. 11, or may be a laminate of two kinds of mask members 68a and 68b having respective widths different from each other as shown in (b) of FIG. 11. When using a laminate of two kinds of members 68a and 68b, the mask member 68a having a smaller width is laminated on the collector 120, and then the mask member 68b having a larger width is laminated on the mask member 68a. Though the mask member 68 shown in (b) of FIG. 11 does not have a taper form, the active material containing layer 140 having the thinner part 140A with a cross-sectional taper form can be formed by regulating the viscosity of the active material containing layer forming coating liquid L1, its drying condition, and the like.

Subsequently performed is a second precursor layer forming step of applying the active material containing layer forming coating liquid L1 onto the face to be formed with the active material containing layer 140 in the collector 120 covered with the mask member 68, and then eliminating the liquid (solvent S) from within the active material containing layer forming coating liquid L1 so as to yield a second laminate.

This step can be performed by the method explained in the first embodiment with reference to FIGS. 6 and 7. The coating step and second precursor layer forming step can also be carried out continuously. The case where the above-mentioned two steps are carried out continuously will now be explained.

Figure 12:
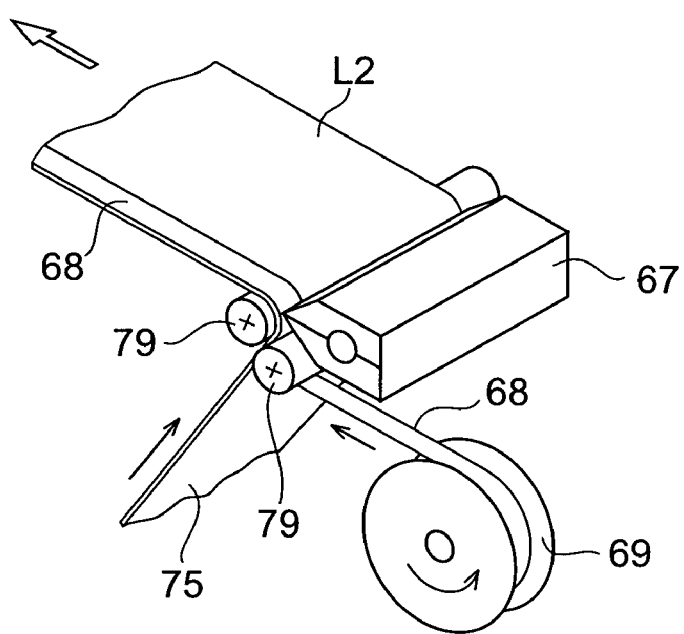
FIG. 12 is an explanatory view for explaining a step of masking a collector with a mask member and forming a coating by using the active material containing layer forming coating liquid.

FIG. 12 is an explanatory view for explaining a step of covering the collector 120 with a mask member 68 and forming a coating L2 by using the active material containing layer forming coating liquid L1. In FIG. 12, an edge part of the collector 120 is covered with the mask member 68, and a portion to be formed with the active material containing layer 140 in the collector 120 is coated with the electrode forming coating liquid L1 by using a coating head 67. The electrode forming coating liquid L1 may be applied to the whole surface of the collector 120 including the upper face of the mask member 68.

Thereafter, the second precursor layer is formed by the apparatus 70 shown in FIGS. 6 and 7. First, the laminate sheet 75 formed with the coating L2 is introduced into the dryer 73 as the core-driving motor revolves. Subsequently, the coating L2 on the laminate sheet 75 is dried in the dryer 73, so as to become a second precursor layer. This yields a second laminate in which the second precursor layer is formed on the collector 120. Then, as the core-driving motor revolves, the laminate sheet in which the second laminate sheet is laminated on the base sheet B1 is guided by way of the support rolls 79 to the core 76 and is wound thereabout.

Next, a removing step of removing the mask member 68 from the second laminate is carried out, so as to form an exposed surface 120A on the face of the collector 120 and form a thinner part 140A at an edge part of the active material containing layer 140, thereby yielding a sheet-like electrode matrix. Thereafter, the sheet-like electrode matrix is cut into a predetermined size and form, so as to yield the electrode matrix 100 having the configuration shown in FIGS. 3 and 4.

When a roll-pressing step is carried out by using this electrode matrix 100, the latter can be pressed at a sufficiently high pressure while fully restraining the boundary portion between the exposed part 220 and laminate part 240 in the collector 120 from being cut. Since the electrode 10 obtained by way of this roll-pressing step sufficiently restrains the exposed part 22 of the collector 12 from being cut and has been subjected to roll-pressing at a sufficiently high pressure as mentioned above, the active material containing layer 14 is fully densified, whereby a sufficient volume capacity can be obtained.

Preferably, in the method of manufacturing an electrode in accordance with the second embodiment, the active material containing layer forming coating liquid L1 contains the conductive auxiliary agent P2 as mentioned above.

When the active material containing layer forming coating liquid L1 contains the conductive auxiliary agent P2, the viscosity of the coating liquid L1 can easily be adjusted, so that the time required for eliminating the liquid (solvent S) after applying the coating liquid L1 can easily be regulated. This makes it easy to adjust the shape of the thinner part 14A, whereby the thinner part 14A having the cross-sectional taper form shown in FIGS. 3 and 4 can easily be formed. Also, since the finally obtained electrode 10 contains the conductive auxiliary agent P2 in the active material containing layer 14, electrode characteristics can be made favorable.

Third Embodiment

A third embodiment of the method of manufacturing an electrode in accordance with the present invention will now be explained. The method of manufacturing an electrode in accordance with the third embodiment is the same as the method of manufacturing an electrode in accordance with the first embodiment except that the preparatory step of preparing the electrode matrix 100 is carried out as follows.

First, in the preparatory step in the third embodiment, a coating liquid preparing step of preparing an active material containing layer forming coating liquid L1 is performed. This coating liquid preparing step can be carried out by the same method as that of the coating liquid preparing step in the first embodiment.

Subsequently performed is an active material containing layer forming step of applying the active material containing layer forming coating liquid L1 to at least one edge part of the face of the collector 120 so as to leave an exposed surface 120A and then eliminating the liquid (solvent S) so as to form an active material containing layer 14, thereby yielding the electrode matrix 100.

The active material containing layer forming step can be performed as in the method explained in the first embodiment with reference to FIGS. 6 and 7 except that the coating with the active material containing layer forming coating liquid L1 is carried out as follows. Namely, the active material containing layer forming coating liquid L1 is applied while reducing the amount of active material containing layer forming coating liquid L1 in a region to be formed with a thinner part 140A such that the thinner part 140A is formed at an edge part of the active material containing layer 140 on a side close to the exposed surface 120A of the collector 120.

Such a coating process can be carried out, for example, by calculating the fluidity (pressure loss) by an extrusion lamination method and regulating the amount of coating. More specific examples include a method in which the coating head 67 shown in FIG. 12 is used for increasing the in-slit resistance at both end parts thereof so as to reduce the discharge rate of the coating liquid at both end parts, and a method in which the in-pocket pressure is lowered at both end parts so as to reduce the discharge rate of the coating liquid at both end parts.

The gravure volume may be decreased when a gravure coater is used for coating, or the gap amount may be adjusted when reverse rolls are used for coating, whereby the coating amount of the coating liquid can be reduced in the region to be formed with the thinner part 140A.

Such a step can yield a sheet-like electrode matrix in which the active material containing layer 140 is formed with the thinner part 140A. Thereafter, the sheet-like electrode matrix is cut into a predetermined size and form, whereby the electrode matrix 100 having the configuration shown in FIGS. 3 and 4 is obtained.

When a roll-pressing step is carried out by using this electrode matrix 100, the latter can be pressed at a sufficiently high pressure while fully restraining the boundary portion between the exposed part 220 and laminate part 240 in the collector 120 from being cut. Since the electrode 10 obtained by way of this roll-pressing step sufficiently restrains the exposed part 22 of the collector 12 from being cut and has been subjected to roll-pressing at a sufficiently high pressure as mentioned above, the active material containing layer 14 is fully densified, whereby a sufficient volume capacity can be obtained.

Preferably, in the method of manufacturing an electrode in accordance with the third embodiment, the active material containing layer forming coating liquid L1 contains the conductive auxiliary agent P2 as mentioned above.

When the active material containing layer forming coating liquid L1 contains the conductive auxiliary agent P2, the viscosity of the coating liquid L1 can easily be adjusted, so that the time required for eliminating the liquid (solvent S) after applying the coating liquid L1 can easily be regulated. This makes it easy to adjust the shape of the thinner part 14A, whereby the thinner part 14A having the cross-sectional taper form shown in FIGS. 3 and 4 can easily be formed. Also, since the finally obtained electrode 10 contains the conductive auxiliary agent P2 in the active material containing layer 14, electrode characteristics can be made favorable.

Though preferred embodiments of the electrode and method of manufacturing an electrode in accordance with the present invention are explained in detail in the foregoing, the present invention is not limited to the above-mentioned embodiments.

For example, though the above-mentioned method of manufacturing an electrode continuously makes a sheet-like electrode matrix and cuts out the electrode matrix 100 having a predetermined size and form from this sheet, the method of manufacturing an electrode in accordance with the present invention may use a method in which an active material containing layer 140 is formed on a collector 120 which has been cut beforehand into a predetermined size and form.

Alternatively, as an application of the second embodiment, the mask member 68 may be attached not only onto the collector 120 in the longitudinal direction thereof but also to a given region such that the active material containing layer 14 has a predetermined size and form, when forming the active material containing layer 14 on the collector 120 by coating. For example, the collector 120 may be subjected to a coating step while the mask member 68 is attached thereto in a direction perpendicular to the longitudinal direction thereof, and then punched out so as to be cut at a portion corresponding to the exposed part 220 left by the mask member 68.

Though the electrode 10 has a configuration in which the active material containing layer 14 is formed on one face of the collector 12, an active material containing layer 14 may further be formed on the other face of the collector 12. In this case, it will be preferred if both of the active material containing layers 14 are formed with respective thinner parts 14A, though it will be sufficient if at least one active material containing layer 14 is formed with the thinner part 14A.

The electrode 10 of the present invention obtained as in the foregoing is used as an electrode for electrochemical devices encompassing electrochemical capacitors such as electric double layer capacitors and secondary batteries such as lithium-ion secondary batteries.

When constructing an electrochemical device by using the electrode 10, it will be sufficient if the electrode 10 is used as an electrode for a conventionally known electrochemical device. When constructing an electric double layer capacitor, for example, at least two electrodes are prepared as an anode and a cathode, and are arranged so as to oppose each other such that their respective active material containing layers face each other. Subsequently, a separator is disposed between the anode and cathode, and they are accommodated in a case which can contain them together with an electrolytic solution in a closed state, whereby an electrochemical device is completed. Here, the exposed part 22 of the collector 12 in the electrode 10 projects out of the case, so as to be used as an external output terminal.

When the electrode 10 of the present invention is used in an electrochemical device such as the electric double layer capacitor mentioned above, the electric double layer capacitor can attain a sufficient volume capacity.

EXAMPLES

In the following, the present invention will be explained more specifically with reference to Examples and Comparative Examples, though the present invention is not limited to the following examples.

Preparing of Active Material Containing Layer Forming Coating Liquid

An activated carbon material (manufactured by Kuraray Chemical Co., Ltd. under the product name of BP-20), a binder (fluorine rubber manufactured by DuPont under the product name of Viton-GF), and a conductive auxiliary agent (acetylene black manufactured by Denki Kagaku Kogyo K.K. under the product name of DENKABLACK) were compounded such that their mass ratio became carbon material/binder/conductive auxiliary agent=90:1:9, and they were put into and kneaded with MIBK (methyl isobutyl ketone), so as to prepare an active material containing layer forming coating liquid.

Example 1

By an extrusion lamination method, the above-mentioned active material containing layer forming coating liquid was applied onto one face of an aluminum foil (having a thickness of 20 μm) which was a collector. Here, the coating was effected such as to leave exposed surfaces at both edge parts of the face of the aluminum foil. At the time of coating, the resistance was made higher in both end parts of a slit nozzle of an extrusion coater (a coating apparatus in the extrusion lamination method) than in the center part, so as to reduce the amount of the coating liquid discharged from the both end parts of the slit nozzle, thereby forming a coating in which the amount of coating was smaller in the edge parts of the active material containing layer close to the exposed surfaces than in the center part. Thereafter, the coating was dried at 120° C. for 5 minutes, so as to eliminate MIBK and yield a laminate in which an active material containing layer having a thickness ($D_1$) of 190 μm was formed on the aluminum foil, thereby obtaining a sheet-like electrode matrix.

Each of the thinner parts in thus obtained sheet-like electrode matrix had a cross-sectional taper form with a width $W_1$ of 2000 μm, a thickness $D_2$ of 0 μm (with a detection limit of 3 μm or less) at the position closest to the exposed surface of the collector, an angle of inclination of 5.4° with respect to a plane parallel to the collector surface, $D_2/D_1$ of 0, and $W_1/D_1$ of 11.

Subsequently, thus obtained sheet-like electrode matrix was punched out such as to have an overall size of 150 mm (length)×100 mm (width) while exposed surfaces each having a size of 20 mm (length)×100 mm (width) were provided at both edge parts thereof, whereby an electrode matrix was obtained.

Next, using a roll press, the electrode matrix was pressed five times from one exposed surface side thereof, so as to yield an electrode of Example 1 having an active material containing layer with a thickness ($D_3$) of 125 μm. The pressure at the time of pressing was a linear pressure of 1000 kgf/cm. At this time, there were no cutting and damages in the boundary portions between the laminate part and exposed parts and no chipping and peeling in the active material containing layer.

Each of the thinner parts in the active material containing layer in thus obtained electrode had a cross-sectional taper form with a width $W_2$ of 2000 μm, a thickness $D_4$ of 0 μm (with a detection limit of 3 μm or less) at the position closest to the exposed surface of the collector, an angle of inclination of 3.6° with respect to a plane parallel to the collector surface, $D_4/D_3$ of 0, and $W_2/D_3$ of 16. The cell capacity of thus obtained electrode was measured and found to be a value within ±5% of a target capacity value.

Here, values measured from a cross-sectional photograph (×100) were used for the widths $W_1$ and $W_2$ and thicknesses $D_1$, $D_2$, $D_3$, $D_4$, whereas the angle of inclination was calculated from the above-mentioned values by using trigonometric functions.

Example 2

An electrode of Example 2 was obtained as in Example 1 except that the difference between the resistance at both end parts of the slit nozzle and the resistance at the center part thereof was a value different from that in Example 1.

The form of the thinner parts in the electrode of Example 2 was different from that of the thinner parts in the electrode of Example 1. Namely, in the state of the electrode matrix, the active material containing layer had a thickness $D_1$ of 190 μm, whereas each thinner part had a cross-sectional taper form with a width $W_1$ of 700 μm, a thickness $D_2$ of 0 μm (with a detection limit of 3 μm or less) at the position closest to the exposed surface of the collector, an angle of inclination of 15.2° with respect to a plane parallel to the collector surface, $D_2/D_1$ of 0, and $W_1/D_1$ of 4.

Using a roll press, the electrode matrix was pressed five times, so as to yield an electrode. Here, there were no cutting and damages in the boundary portions between the laminate part and exposed parts and no chipping and peeling in the active material containing layer.

In thus obtained electrode, the active material containing layer had a thickness $D_3$ of 125 μm, whereas each thinner part had a cross-sectional taper form with a width $W_2$ of 700 μm, a thickness $D_4$ of 0 μm (with a detection limit of 3 μm or less) at the position closest to the exposed surface of the collector, an angle of inclination of 10.1° with respect to a plane parallel to the collector surface, $D_4/D_3$ of 0, and $W_2/D_3$ of 6. The cell capacity of thus obtained electrode was measured and found to be a value within ±5% of a target capacity value.

Example 3

An electrode of Example 3 was obtained as in Example 1 except that the difference between the resistance at both end parts of the slit nozzle and the resistance at the center part thereof was a value different from that in Example 1.

The form of the thinner parts in the electrode of Example 3 was different from that of the thinner parts in the electrode of Example 1. Namely, in the state of the electrode matrix, the active material containing layer had a thickness $D_1$ of 190 μm, whereas each thinner part had a cross-sectional taper form with a width $W_1$ of 3500 μm, a thickness $D_2$ of 0 μm (with a detection limit of 3 μm or less) at the position closest to the exposed surface of the collector, an angle of inclination of 3.1° with respect to a plane parallel to the collector surface, $D_2/D_1$ of 0, and $W_1/D_1$ of 18.

Using a roll press, the electrode matrix was pressed five times, so as to yield an electrode. Here, there were no cutting and damages in the boundary portions between the laminate part and exposed parts and no chipping and peeling in the active material containing layer.

In thus obtained electrode, the active material containing layer had a thickness $D_3$ of 125 μm, whereas each thinner part had a cross-sectional taper form with a width $W_2$ of 3500 μm, a thickness $D_4$ of 0 μm (with a detection limit of 3 μm or less) at the position closest to the exposed surface of the collector, an angle of inclination of 2.0° with respect to a plane parallel to the collector surface, $D_4/D_3$ of 0, and $W_2/D_3$ of 28. The cell capacity of thus obtained electrode was measured and found to be a value bit lower (−5%) than a target capacity value but not problematic in practice.

Example 4

A first mask tape having a thickness of 0.5 mm and a width of 8 mm was attached to a region to be formed with an exposed surface on a surface of an aluminum foil (having a thickness of 20 μm) to be formed with an active material containing layer, and a second mask tape having a thickness of 0.5 mm and a width of 9 mm was attached onto the first mask tape such as to form a protrusion projecting in a direction to be formed with the active material containing layer and forming a gap with the collector as shown in (b) of FIG. 11.

By the extrusion lamination method, the above-mentioned active material containing layer forming coating liquid was applied onto the aluminum foil in which one edge part of the surface was covered with the mask tapes. Thereafter, drying was carried out for 5 minutes at 120° C., and the first and second mask tapes were peeled off. This formed an exposed surface in a region on the aluminum foil to which the first mask tape was attached, and a thinner part at an edge part of the active material containing layer on the side close to the exposed surface. Thus obtained was a sheet-like electrode matrix having an active material containing layer with a thickness ($D_1$) of 190 μm formed on the aluminum foil, and a thinner part formed at an edge part of the active material containing layer. Here, the thinner part had a cross-sectional taper form with a width $W_1$ of 1000 μm, a thickness $D_2$ of 10 μm at the position closest to the exposed surface of the collector, an angle of inclination of 10.2° with respect to a plane parallel to the collector surface, $D_2/D_1$ of 0.05, and $W_1/D_1$ of 5.

Subsequently, thus obtained sheet-like electrode matrix was punched out into a size of 150 mm (length)×100 mm (width) (with an exposed surface of 20 mm (length)×100 mm (width)) so as to include the exposed surface, whereby an electrode matrix was obtained.

Next, using a roll press, the electrode matrix was pressed five times from the exposed surface side thereof, so as to yield an electrode of Example 4 having an active material containing layer with a thickness ($D_3$) of 125 μm. The pressure at the time of pressing was a linear pressure of 1000 kgf/cm. At this time, there were no cutting and damages in the boundary portion between the laminate part and exposed part and no chipping and peeling in the active material containing layer.

The thinner part in the active material containing layer in thus obtained electrode had a cross-sectional taper form with a width $W_2$ of 1000 μm, a thickness $D_4$ of 8 μm at the position closest to the exposed surface of the collector, an angle of inclination of 6.7° with respect to a plane parallel to the collector surface, $D_4/D_3$ of 0.06, and $W_2/D_3$ of 8. The cell capacity of thus obtained electrode was measured and found to be a value within ±5% of a target capacity value.

Example 5

An electrode of Example 5 was obtained as in Example 4 except that a thinner part was formed in the following procedure.

Namely, when forming the active material containing layer on the aluminum foil, the amount of active material containing layer forming coating liquid supplied from the nozzle was adjusted and altered, so as to change the form of the thinner part. In thus obtained electrode matrix, the active material containing layer had a thickness $D_1$ of 190 μm, whereas each thinner part had a cross-sectional taper form with a width $W_1$ of 1000 μm, a thickness $D_2$ of 17 μm at the position closest to the exposed surface of the collector, an angle of inclination of 9.8° with respect to a plane parallel to the collector surface, $D_2/D_1$ of 0.09, and $W_1/D_1$ of 5.

Using a roll press, the electrode matrix was pressed five times, so as to yield an electrode. Here, there were no cutting and damages in the boundary portion between the laminate part and exposed part and no chipping and peeling in the active material containing layer.

In thus obtained electrode, the active material containing layer had a thickness $D_3$ of 125 μm, whereas the thinner part had a cross-sectional taper form with a width $W_2$ of 1000 μm, a thickness $D_4$ of 8 μm at the position closest to the exposed surface of the collector, an angle of inclination of 6.7° with respect to a plane parallel to the collector surface, $D_4/D_3$ of 0.06, and $W_2/D_3$ of 8. The cell capacity of thus obtained electrode was measured and found to be a value within ±5% of a target capacity value.

Example 6

An electrode of Example 6 was obtained as in Example 4 except that the thinner part was formed in the following procedure.

Namely, in an electrode matrix similar to that of Example 4 in which an active material containing layer having a thinner part was formed on an aluminum foil, the edge part of the active material containing layer formed with the thinner part was further shaved with a lapping film (#1000), so as to form a thinner part with no stepped gap between the laminate part and exposed part. This yielded the electrode matrix in Example 6 in which the thickness $D_1$ of the active material containing layer was 190 μm. In this electrode matrix, the thinner part had a cross-sectional taper form with a width $W_1$ of 2000 μm, a thickness $D_2$ of 0 μm (with a detection limit of 3 μm or less) at the position closest to the exposed surface of the collector, an angle of inclination of 5.4° with respect to a plane parallel to the collector surface, $D_2/D_1$ of 0, and $W_1/D_1$ of 11.

Using a roll press, the electrode matrix was pressed five times, so as to yield an electrode. Here, there were no cutting and damages in the boundary portion between the laminate part and exposed part and no chipping and peeling in the active material containing layer.

In thus obtained electrode, the active material containing layer had a thickness $D_3$ of 125 μm, whereas the thinner part had a cross-sectional taper form with a width $W_2$ of 2000 μm, a thickness $D_4$ of 0 μm (with a detection limit of 3 μm or less) at the position closest to the exposed surface of the collector, an angle of inclination of 3.6° with respect to a plane parallel to the collector surface, $D_4/D_3$ of 0, and $W_2/D_3$ of 16. The cell capacity of thus obtained electrode was measured and found to be a value within ±5% of a target capacity value.

Example 7

An electrode of Example 7 was obtained as in Example 4 except that a thinner part was formed in the following procedure.

Namely, in an electrode matrix similar to that of Example 4 in which an active material containing layer having a thinner part was formed on an aluminum foil, an edge part of the active material containing layer formed with the thinner part was further subjected to pressing under pressure with a flat thermal press (with a pressing temperature of 190° C., a pressing time of 30 seconds, and a load of 4 kgf/cm²), so as to form a thinner part with no stepped gap between the laminate part and exposed part. This yielded the electrode matrix in accordance with Example 7 in which the thickness $D_1$ of the active material containing layer was 190 μm. In this electrode matrix, the active material containing layer had a thickness $D_1$ of 190 μm, whereas the thinner part had a cross-sectional taper form with a width $W_1$ of 2000 μm, a thickness $D_2$ of 0 μm (with a detection limit of 3 μm or less) at the position closest to the exposed surface of the collector, an angle of inclination of 5.4° with respect to a plane parallel to the collector surface, $D_2/D_1$ of 0, and $W_1/D_1$ of 11.

Using a roll press, the electrode matrix was pressed five times, so as to yield an electrode. Here, there were no cutting and damages in the boundary portion between the laminate part and exposed part and no chipping and peeling in the active material containing layer.

In thus obtained electrode, the active material containing layer had a thickness $D_3$ of 125 μm, whereas the thinner part had a cross-sectional taper form with a width $W_2$ of 2000 μm, a thickness $D_4$ of 0 μm (with a detection limit of 3 μm or less) at the position closest to the exposed surface of the collector, an angle of inclination of 3.6° with respect to a plane parallel to the collector surface, $D_4/D_3$ of 0, and $W_2/D_3$ of 16. The cell capacity of thus obtained electrode was measured and found to be a value within ±5% of a target capacity value.

Comparative Example 1

By the extrusion lamination method, the above-mentioned active material containing layer forming coating liquid was applied onto one face of an aluminum foil similar to that of Example 1. Here, the coating was effected such as to leave exposed surfaces at both edge parts of the face of the aluminum foil. Thereafter, the coating was dried at 120° C. for 5 minutes, so as to eliminate MIBK and yield a sheet-like electrode matrix in which an active material containing layer having a thickness ($D_1$) of 190 μm was formed on the aluminum foil.

Smoothly bulged forms due to the surface tension of a paint were seen in end portions of the edge parts of the active material containing layer close to the exposed surfaces in thus obtained laminate. Specifically, the thickness $D_2$ of the portion closest to the exposed surface in the collector was 200 μm at the highest portion. The angle of inclination with respect to a plane parallel to the collector surface was about 90°, whereas a portion forming an angle of 90° or greater (so-called "overhang" form) was partly seen as well.

Subsequently, thus obtained sheet-like electrode matrix was punched out such as to have an overall size of 150 mm (length)×100 mm (width) while exposed surfaces each having a size of 20 mm (length)×100 mm (width) were provided at both edge parts thereof, whereby an electrode matrix was obtained.

Next, using a roll press, the electrode matrix was pressed five times from one exposed surface side thereof, so as to yield an electrode of Example 1 having an active material containing layer with a thickness ($D_3$) of 125 μm. The pressure at the time of pressing was a linear pressure of 1000 kgf/cm. Here, the boundary portion between the laminate and exposed part in the collector was cut, thus failing to make an electrode which could be evaluated.

Comparative Example 2

The first mask of Example 4 was attached onto a surface to be formed with an active material containing layer in an aluminum foil similar to that of Example 1 and, by the extrusion lamination method, the above-mentioned active material containing layer forming coating liquid was applied onto the surface of the aluminum foil having the mask tape attached thereto. Thereafter, the coating was dried at 120° C. for 5 minutes, so as to eliminate MIBK, and then the mask tape was peeled off from the upper side of the aluminum foil, so as to yield a sheet-like electrode matrix in which an active material containing layer having a thickness ($D_1$) of 190 μm was formed on the aluminum foil.

The part stripped of the mask tape was employed as an exposed surface of the collector. The edge part of the active material containing layer close to the exposed surface in the laminate was seen to have a form substantially perpendicular to the exposed surface. Specifically, the thickness $D_2$ of the region closest to the exposed surface in the collector was 190 μm at the highest portion. The angle of inclination with respect to a plane parallel to the collector surface was about 90°.

Subsequently, thus obtained sheet-like electrode matrix was punched out such as to have an overall size of 150 mm (length)×100 mm (width) while exposed surfaces (surfaces stripped of the mask) each having a size of 20 mm (length)×100 mm (width) were provided at both edge parts thereof, whereby an electrode matrix was obtained.

Next, using a roll press, the electrode matrix was pressed five times from one exposed surface side thereof, so as to yield an electrode of Example 1 having an active material containing layer with a thickness ($D_3$) of 125 μm. The pressure at the time of pressing was a linear pressure of 1000 kgf/cm. Here, the active material containing layer of the collector was cut throughout the surface in a portion close to the exposed part, thus failing to make an electrode which could be evaluated.

As can be seen from the foregoing results, it has been verified that the method of manufacturing an electrode in accordance with the present invention can fully restrain the boundary portion between the laminate part and exposed part of the collector from being cut at the time of roll-pressing. Since the boundary portion between the laminate part and exposed part of the collector can fully be restrained from being cut, the pressure at the time of roll-pressing can be set sufficiently high, so that the active material containing layer can fully be compressed, thus improving the density. Therefore, the method of manufacturing an electrode in accordance with the present invention can yield an electrode having a sufficient volume capacity.

What is claimed is:

1. A method of manufacturing an electrode, the method comprising a preparatory step of preparing an electrode matrix comprising a collector and an active material containing layer formed on at least one face of the collector, the active material containing layer including a first surface facing the collector and a second surface facing away from the collector, at least one edge part of the collector including an exposed surface free of the active material containing layer, an edge part of the second surface of the active material containing layer on a side close to the exposed surface tapering toward the exposed surface of the collector such that the active material containing layer includes a thinner part having a thickness at a position closest to the exposed surface, the thickness of the thinner part being greater than zero and smaller than a maximum thickness of the active material containing layer; and a roll-pressing step of pressing the electrode matrix with a roll press.

2. A method of manufacturing an electrode according to claim 1, wherein the thinner part has a width $W_1$ (μm) in a direction from an edge part of the active material containing layer to a center part thereof satisfying the condition represented by the following expression (1):

$$(4 \times D_1) \leq W_1 \leq (30 \times D_1) \quad (1)$$

where $D_1$ is the maximum thickness (μm) of the active material containing layer in the electrode matrix.

3. A method of manufacturing an electrode according to claim 1, wherein the thinner part has a thickness $D_2$ (μm) at a position closest to the exposed surface satisfying the condition represented by the following expression (2):

$$D_2 \leq (0.1 \times D_1) \quad (2)$$

where $D_1$ is the maximum thickness (μm) of the active material containing layer in the electrode matrix.

4. A method of manufacturing an electrode according to claim 1, wherein the electrode matrix has respective exposed surfaces at both edge parts of the face of the collector, and respective thinner parts at both edge parts of the active material containing layer close to the exposed surfaces.

5. A method of manufacturing an electrode according to claim 1, wherein the preparatory step includes:
a first precursor layer forming step of forming a first precursor layer to become the active material containing layer onto the face of the collector so as to leave the exposed surface in at least one edge part of the face; and
a thinner part forming step of forming a thinner part at an edge part of the first precursor layer on the side close to the exposed surface, so as to yield the electrode matrix.

6. A method of manufacturing an electrode according to claim 5, wherein the thinner part forming step is a step of forming the thinner part by shaving the edge part of the first precursor layer.

7. A method of manufacturing an electrode according to claim 5, wherein the thinner part forming step is a step of forming the thinner part by pressing the edge part of the first precursor layer.

8. A method of manufacturing an electrode according to claim 7, wherein the pressing is carried out by using a roll member capable of pressing the edge part of the first precursor layer.

9. A method of manufacturing an electrode according to claim 1, wherein the preparatory step includes:
a coating liquid preparing step of preparing an active material containing layer forming coating liquid containing an electrode active material, a binder adapted to bind the electrode active material, and a liquid adapted to dissolve or disperse the binder;
a masking step of covering at least one edge part of the face of the collector with a mask member having a protrusion projecting in a direction to be formed with the active material containing layer so as to form a gap with the collector;
a second precursor layer forming step of applying the active material containing layer forming coating liquid onto the face of the collector and then eliminating the liquid, so as to form a second precursor layer to become the active material containing layer, and yield a second laminate; and
a removing step of removing the mask member from the second laminate, so as to form the exposed surface on the face of the collector and form the thinner part at an edge part of the second precursor layer on a side close to the exposed surface, and yield the electrode matrix.

10. A method of manufacturing an electrode according to claim 9, wherein the active material containing layer forming coating liquid further contains a conductive auxiliary agent.

11. A method of manufacturing an electrode according to claim 1, wherein the preparatory step includes:
a coating liquid preparing step of preparing an active material containing layer forming coating liquid containing an electrode active material, a binder adapted to bind the electrode active material, and a liquid adapted to dissolve or disperse the binder; and
an active material containing layer forming step of applying the active material containing layer forming coating liquid onto the face of the collector such as to leave the exposed surface in at least one edge part of the face and then eliminating the liquid, so as to form the active material containing layer, and yield the electrode matrix;

wherein the active material containing layer forming step reduces an amount of the active material containing layer forming coating liquid applied to a region to be formed with the thinner part so as to form the thinner part at the edge part of the active material containing layer on the side close to the exposed surface.

12. An electrode comprising a collector and an active material containing layer formed on at least one face of the collector, the active material containing layer including a first surface facing the collector and a second surface facing away from the collector;

wherein at least one edge part of the collector includes an exposed surface free of the active material containing layer;

wherein an edge part of the second surface of the active material containing layer on a side close to the exposed surface tapers toward the exposed surface of the collector such that the active material containing layer includes a thinner part having a thickness at a position closest to the exposed surface, the thickness of the thinner part being greater than zero and smaller than a maximum thickness of the active material containing layer; and wherein the collector and active material containing layer are pressed.

13. An electrode comprising a collector and an active material containing layer formed on at least one face of the collector;

wherein at least one edge part of the collector includes an exposed surface free of the active material containing layer;

wherein an edge part of the active material containing layer on a side close to the exposed surface includes a thinner part having a thickness smaller than a maximum thickness of the active material containing layer;

wherein the collector and active material containing layer are pressed; and wherein the thinner part has a width $W_2$ (μm) in a direction from the edge part of the active material containing layer to a center part thereof satisfying the condition represented by the following expression (3):

$$(4 \times D_3) \leq W_2 \leq (30 \times D_3) \tag{3}$$

where $D_3$ is the maximum thickness (μm) of the active material containing layer in the electrode.

14. An electrode comprising a collector and an active material containing layer formed on at least one face of the collector;

wherein at least one edge part of the collector includes an exposed surface free of the active material containing layer;

wherein an edge part of the active material containing layer on a side close to the exposed surface includes a thinner part having a thickness smaller than a maximum thickness of the active material containing layer;

wherein the collector and active material containing layer are pressed; and wherein the thinner part has a thickness $D_4$ (μm) at a position closest to the exposed surface satisfying the condition represented by the following expression (4):

$$D_4 \leq (0.1 \times D_3) \tag{4}$$

where $D_3$ is the maximum thickness (μm) of the active material containing layer in the electrode.

* * * * *